United States Patent
Millington

(10) Patent No.: US 6,611,753 B1
(45) Date of Patent: Aug. 26, 2003

(54) 3-DIMENSIONAL INTERSECTION DISPLAY FOR VEHICLE NAVIGATION SYSTEM

(75) Inventor: Jeffrey Alan Millington, Rochester Hills, MI (US)

(73) Assignee: Magellan DIS, Inc., Rochester, MI (US)

(*) Notice: Subject to any disclaimer, the term of this patent is extended or adjusted under 35 U.S.C. 154(b) by 0 days.

(21) Appl. No.: 09/062,518

(22) Filed: Apr. 17, 1998

(51) Int. Cl.[7] .................. G01C 21/30; G06T 15/40; H04N 7/00
(52) U.S. Cl. .............. 701/209; 701/208; 701/211; 340/988; 340/990; 340/995; 345/421; 345/427; 348/113; 348/115
(58) Field of Search ................. 701/207, 208, 701/209, 210, 211, 212, 200, 201, 202; 340/988, 990, 995; 345/419, 421, 427, 581; 702/5; 348/113, 115, 116, 118, 119; 73/178 R

(56) References Cited

U.S. PATENT DOCUMENTS

| | | | |
|---|---|---|---|
| 4,796,189 A | | 1/1989 | Nakayama et al. .......... 701/209 |
| 4,937,570 A | | 6/1990 | Matsukawa et al. ........ 340/905 |
| 4,940,972 A | | 7/1990 | Mouchot et al. ............. 345/421 |
| 5,067,083 A | | 11/1991 | Nakayama et al. .......... 701/220 |
| 5,323,321 A | | 6/1994 | Smith, Jr. ..................... 701/211 |
| 5,473,447 A | | 12/1995 | Molteni et al. ............... 359/13 |
| 5,557,522 A | | 9/1996 | Nakayama et al. .......... 701/200 |
| 5,732,385 A | * | 3/1998 | Nakayama et al. .......... 701/201 |
| 5,742,924 A | * | 4/1998 | Nakayama ................... 701/208 |
| 5,748,109 A | | 5/1998 | Kosaka et al. ............... 340/995 |
| 5,757,289 A | * | 5/1998 | Nimura et al. ............... 701/201 |
| 5,757,290 A | * | 5/1998 | Watanabe et al. ........... 701/200 |
| 5,862,498 A | * | 1/1999 | Koyanagi et al. ........... 701/211 |
| 5,862,510 A | * | 1/1999 | Saga et al. ................... 701/208 |
| 5,897,604 A | * | 4/1999 | Takahashi et al. .......... 701/208 |
| 5,938,718 A | * | 8/1999 | Morimoto et al. .......... 701/201 |
| 5,945,927 A | * | 8/1999 | Nakayama et al. ......... 701/210 |
| 5,951,621 A | * | 9/1999 | Palalau et al. ............... 701/211 |
| 5,974,876 A | * | 11/1999 | Hijikata et al. .............. 701/210 |
| 6,011,494 A | * | 1/2000 | Watanabe et al. ........... 701/211 |
| 6,012,014 A | * | 1/2000 | Koyanagi et al. ........... 701/208 |
| 6,037,975 A | * | 3/2000 | Aoyama ...................... 348/113 |

FOREIGN PATENT DOCUMENTS

| | | | | |
|---|---|---|---|---|
| EP | 0738876 | | 10/1996 | |
| FR | 2674652 | | 10/1992 | |
| JP | 05018767 A | * | 1/1993 | ........... G01C/21/00 |
| JP | 9171348 | | 6/1997 | |
| JP | 9318380 | | 12/1997 | |

* cited by examiner

Primary Examiner—Jacques H. Louis-Jacques
(74) Attorney, Agent, or Firm—Carlson, Gaskey & Olds, P.C.

(57) ABSTRACT

A navigation system includes a display which provides a 3-D perspective view. The angle of viewing in the perspective view is increased based upon the complexity of the intersection being displayed. Intersections of increased complexity are displayed at an increased viewing angle to facilitate understanding. A sky above a horizon on the display changes color based upon the time of day.

20 Claims, 3 Drawing Sheets

3-DIMENSIONAL INTERSECTION DISPLAY FOR VEHICLE NAVIGATION SYSTEM

BACKGROUND OF THE INVENTION

Vehicle navigation systems determine a current position of the vehicle relative to a database of roads and display a recommended route via the database of roads to a destination selected by the user. Some navigation systems have provided algorithms for transforming data in the database into a 3-dimensional perspective view which is more easily understood by many users. In one such system, the navigation system selects a point at some elevation above the vehicle's current position, or slightly behind the vehicle's current position, from which to calculate the perspective view of the roads.

In some situations, it can be difficult to discern a specific road from the display. For example, at an intersection of two roads at an acute angle, it may be difficult to discern the two roads in a perspective view. Also, where there are two or more intersections in close proximity, it may be difficult to discern the location of one road versus another in a perspective view. Further, complex intersections, such as rotaries, with multiple intersections of roads in close proximity may not be easy to understand from the perspective view.

SUMMARY OF THE INVENTION

The present invention provides a vehicle navigation system or route guidance system with improved perspective view display. Generally, the navigation system displays a perspective view of an intersection indicating the next maneuver to be performed by the driver along the recommended route. The navigation system displays the intersection at an angle relative to "earth." Based upon the complexity of the intersection displayed, the angle is increased to provide a more "overhead" view. The increased angle of the perspective view improves the understanding of the roads in the intersection.

For example, if there are many roads intersecting in the area to be displayed, increasing the viewing angle will provide more space on the screen between the roads, thereby increasing the understanding of the intersection. Further, the maneuver which is being recommended by the navigation system (such as by indicating an arrow on one of the intersecting roads) is more readily perceived.

The display displays a horizon and sky in the perspective view. Based upon the time of day (and time of year), which can be gathered from the GPS system, the color of the sky changes. During the day, the sky in the display is preferably a shade of blue which gradually shifts to black at night and back to blue. In this manner, the display assists the observer in associating the perspective view on the display with what the observer sees outside in front of the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
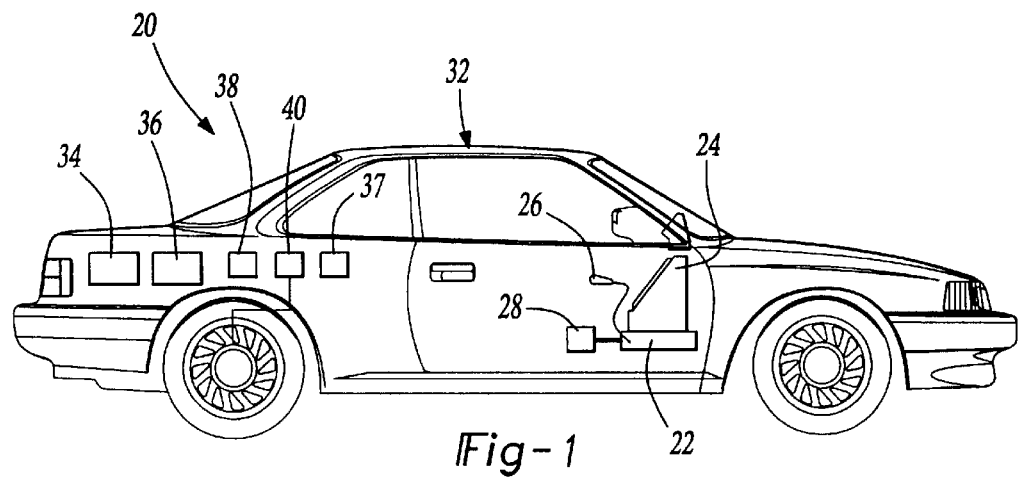
FIG. 1 is a schematic of the navigation system of the present invention.

The navigation system 20 of the present invention is shown schematically in FIG. 1. The navigation system 20 includes a processor or CPU 22 connected to a display 24, such as a high resolution LCD or flat panel display. The CPU 22 is also connected to an input device 26 such as a mouse, keyboard, key pad or remote device. Alternatively, the display 24 can be a touch screen display. The navigation system 20 further includes a storage device 28, such as a hard drive 28 or CD ROM, connected to the CPU 22. The storage device 28 contains a database including a map of all the roads in the area to be traveled by the vehicle 32 and may contain the software for the CPU 22, including the graphical user interface, route guidance, operating system, position-determining software, etc.

The navigation system 20 preferably includes position and motion determining devices, such as a GPS receiver 34, a gyroscope 36, an orthogonal three-axis accelerometer 37, a compass 38 and a wheel speed sensor 40, all connected to the CPU 22 (connections not shown for simplicity). These and other position and motion determining devices are known and are commercially available.

As is well known, the position and motion determining devices determine the position of the vehicle 32 relative to the database of roads. Further, as is known in navigation systems, the user can select a destination relative to the database of roads utilizing the input device 26 and the display 24. The navigation system 20 then calculates and displays a recommended route directing the driver of the vehicle 32 to the desired destination. Preferably, the navigation system 20 displays turn-by-turn instructions on display 24, guiding the driver to the desired destination.

Generally, the database of roads contains 2-dimensional data indicating locations of intersections, lengths of road segments and angles of intersection, generally represented in FIGS. 2A–E. The 2-dimensional data includes the location of the intersection, the number of road segments (or "arms") and the angles between the arms.

Figures 2A, 2D:
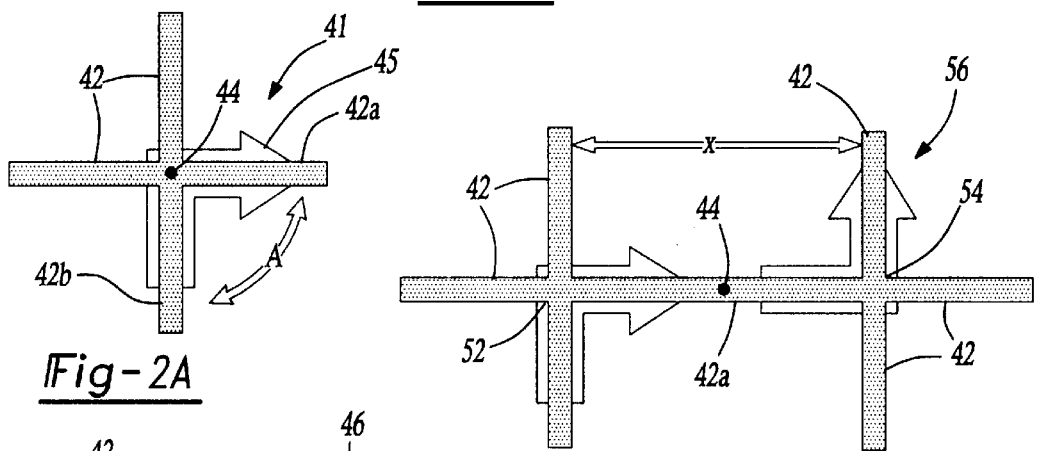
FIGS. 2A–2E represent 2-dimensional data in the database of roads in the navigation system of FIG. 1 for various types of intersections.

FIG. 2A represents 2-dimensional data for a simple intersection 41. The simple intersection 41 comprises a plurality of "arms" 42 or road segments 42 intersecting at the node 44 of the intersection 41. Based upon the route calculated by the navigation system 20, the navigation system 20 will recommend a maneuver 45 onto a "TO" arm 42a from a "FROM" arm 42b, which is oriented toward the bottom of the display 24. The "TO" arm 42a is separated from the nearest adjacent arm 42 by an angle A. In this case, the angle A is 90 degrees.

Figure 2B:
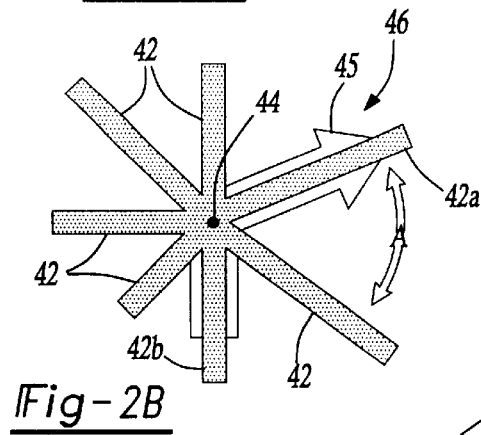

FIG. 2B illustrates the 2-dimensional data for a more complicated intersection 46 having seven arms 42 intersecting at a node 44. A "TO" arm 42a is separated from the nearest arm 42 by an angle A, which is not less than a predetermined threshold, preferably 20 degrees.

Figure 2E:
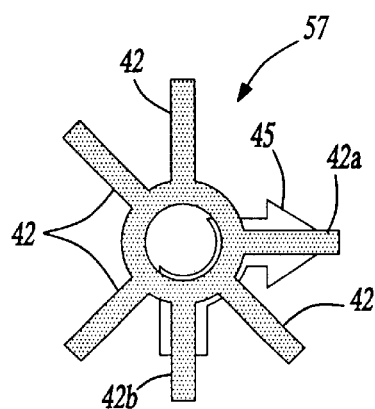
Figure 2C:
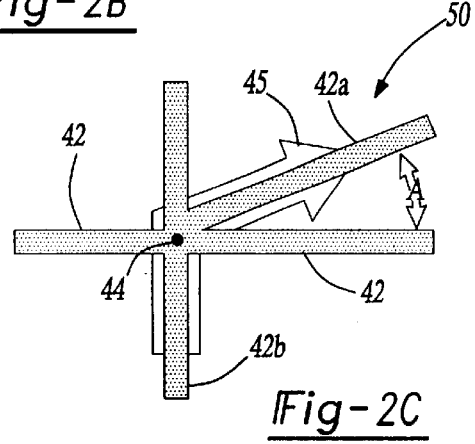

FIG. 2C illustrates an intersection 50 having five arms 42. A "TO" arm 42a is separated from the nearest arm 42 by an angle A, which is less than a predetermined threshold, preferably 20 degrees.

FIG. 2D illustrates a pair of intersections 52, 54, which are both part of a complex maneuver 56. The intersections 52, 54 share arm 42a which has a length x which is less than a predetermined threshold, such as 200 feet. Also a factor in making the complex maneuver 56 complex is the fact that a maneuver must be performed at intersection 52 and a maneuver must be performed at intersection 54.

FIG. 2E illustrates a rotary 57 having a plurality of arms 42 including a TO arm 42a. A sample recommended maneuver 45 is shown superimposed on the rotary 57. It should be understood that the recommended maneuvers 45 shown are not part of the 2-dimensional data in the database, but are a result of the navigation system's 20 recommended route to a user-selected destination.

Figure 3:
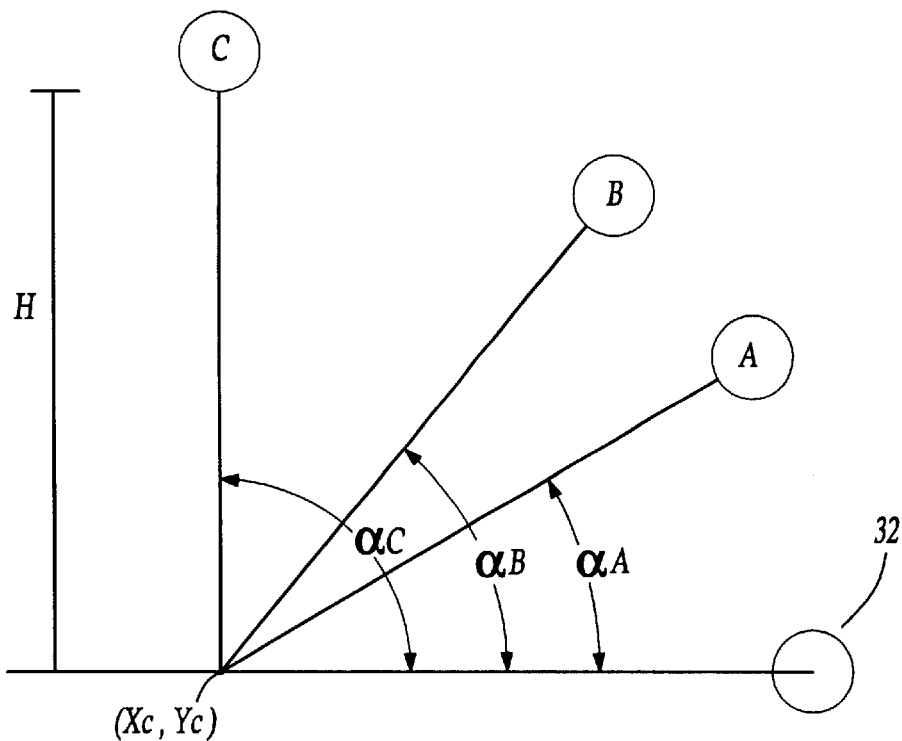
FIG. 3 illustrates the view angles from which a perspective view is calculated in the navigation system of FIG. 1.

Generally, the 2-dimensional data, as represented in FIGS. 2A–2E, is transformed via scaling, rotation and translation into a 3-D perspective view by the CPU 22, generally utilizing known rendering techniques. Referring to FIG. 3, the 3-D model is created as a perspective view of the road in front of the vehicle 32. The perspective view is calculated at an elevation, H, above the earth at an angle $\alpha$ relative to a center (Xc, Yc) of the displayed intersection. For a simple intersection 41, such as is shown in FIG. 2A, the perspective view may be calculated from a "camera position" A in FIG. 3, at an angle $\alpha_A$, preferably 30 degrees. For a moderately complex intersection 46, such as that shown in FIG. 2C, the perspective view may be calculated from a position B as shown in FIG. 3 at an angle $\alpha_B$, preferably 50 degrees. For a very complex intersection 57, such as that shown in FIG. 2E, the view may be calculated from a position C as shown in FIG. 3 at an angle $\alpha_C$, preferably 90 degrees. The angle $\alpha$ increases based upon the complexity of the intersection. The complexity is determined based upon the number of arms 42 and the angle A between the TO arm 42a and the nearest adjacent arm 42. Further, two maneuvers 52, 54 within a predetermined distance may indicate complexity of an intersection. Further, certain types of intersections may indicate complex intersections. For example, a rotary may indicate a very complex intersection, while a U-turn may indicate a medium complex intersection.

It should be apparent that other angles between $\alpha_A$ and $\alpha_C$ may be utilized to calculate perspective views of intersections of moderate complexity. Preferably, any intersection displayed is first displayed as calculated from point C and angle $\alpha_C$, i.e. 90 degrees. If the intersection is not very complex, the angle $\alpha$ is then decreased and the view is continuously, gradually changed to the appropriate angle $\alpha$ as the vehicle 32 approaches the intersection. In this manner, the user can see the perspective change and more easily understand the intersection perspective view displayed. Alternatively the angle $\alpha$ can be increased from the appropriate angle $\alpha$ to 90 degrees as the vehicle approaches the intersection.

Figure 4:
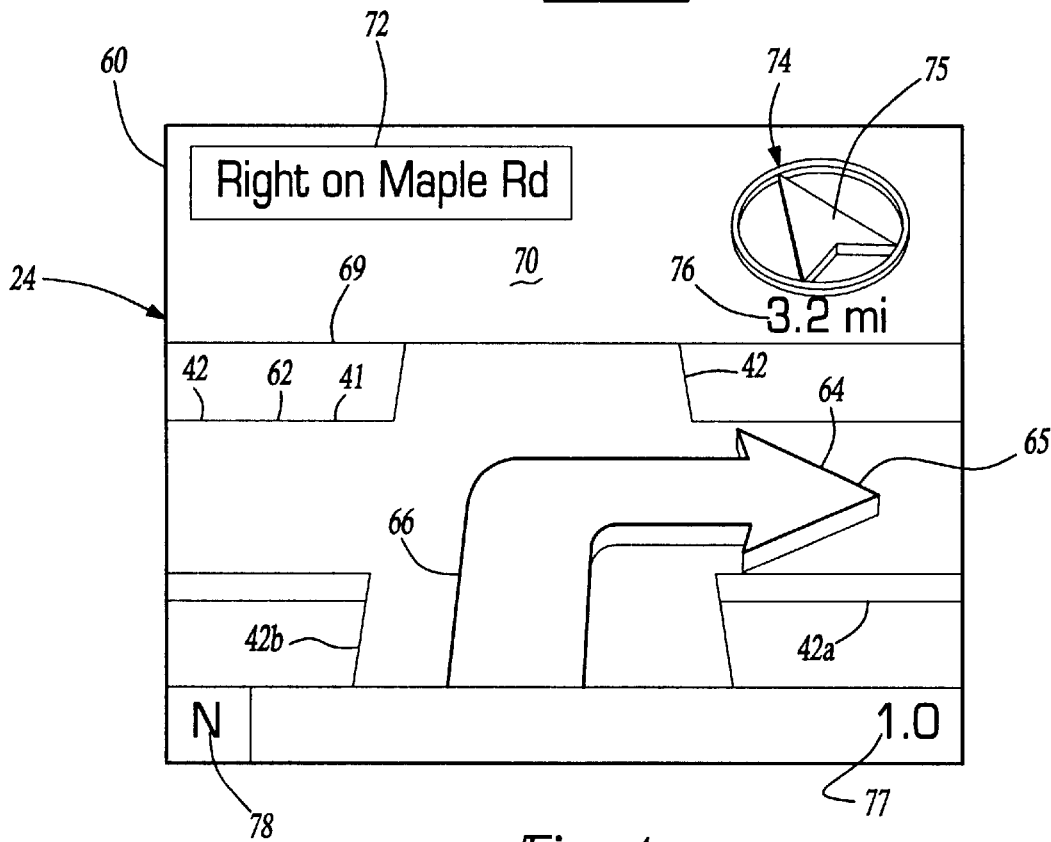
FIG. 4 is the display of FIG. 1 showing a perspective view of an area of FIG. 2A calculated according to a first viewing angle of FIG. 3.

For illustration, the transformation of the 2-dimensional data for the intersection of intersection 41 of FIG. 2A into the three dimensional perspective view of FIG. 4 will be described. FIG. 4 illustrates the display 24 of FIG. 1 showing a display 60 of a 3-dimensional representation 62 of the intersection represented in FIG. 2A displayed at a perspective view calculated according to angle $\alpha$ A shown in FIG. 3, which for this simple intersection is 30 degrees. First the intersection 41 is rendered into a polygon having arms 42 separated by the angles specified in the 2-dimensional data. Additional perpendicular polygons are then added to create a three dimensional appearance. The three dimensional representations of the arms 42 preferably each have an equal predetermined length.

The display 60 further includes a maneuver instruction 64, preferably a 3-dimensional representation of an arrow 64 superimposed on the 3-dimensional representation 62 of the intersection. The arrow 64 is also 3-dimensional and shown in the same perspective. A head 65 of the arrow 64 is first rendered on the TO arm 42a, at a fixed distance from the intersection from the center of the intersection. A tail 66 is then rendered on the FROM arm 42b, at a fixed distance from the intersection from the center of the intersection. A point of intersection between lead lines in the head 65 and tail 66 is then utilized to create an inner arc and an outer arc from the head 65 to the tail 66. A plurality of polygons between the inner and outer arcs are rendered from the head 65 to the tail 66 to create the body of the arrow 64.

The point on the maneuver to be centered on the display 24 is then calculated. The extent or bounds for the entire maneuver is first computed. This is recorded as a minimum X, Y and a maximum X, Y. The extent or bounds for the turn indicator (arrow) 64 is computed and also recorded as a minimum X, Y and maximum X, Y. The center (Xc, Yc) for the entire maneuver (biased with the turn indicator) is computed as follows:

Xc=AVG (ArrowMinimum.X, ArrowMaximum.X)
Yc=AVG (ManeuverMinimum.Y, ManeuverMaximum.Y)

The entire 3D polygon(s) making up the 3D maneuver are then translated so that the new calculated center is positioned as the new origin (0,0). The camera's initial position is at 90 degrees (point C in FIG. 3 at angle $\alpha_C$). The camera position is specified in X, Y, Z coordinates. The X, Y and coordinates are set to 0,0. The Z coordinate (or altitude) is computed as follows:

Definitions
W=one half of the width of the entire maneuver in the dominant axis.
H=height of the camera overlooking the maneuver
FOV=Field of View (used when transforming 3D coordinates into screen coordinates)
theta=FOV/2

The span of the entire maneuver in each direction is compared to determine which is longer (taking the aspect ratio of the viewport into consideration).

Aspect Ratio=305 pixels in the X direction/230 pixels in the Y direction
If (ManeuverSpan in the Y axis*Aspect Ratio) >ManeuverSpan in the X axis
ManeuverSpan in the Y axis is dominant
Else
ManeuverSpan in the X axis is dominant
If Maneuver in the Y axis contributes more (dominant)
W=(ManeuverMaximum.Y−ManeuverMinimum.Y)/2
If Maneuver in the X axis contributes more (dominant)
W=(ManeuverMaximum.X−ManeuverMinimum.X)/2
H=W/tan (theta)
Z=H The initial coordinates for the camera position are specified as (0,0,H). The range of camera positions are based on the complexity of the maneuver. The following factors are used to determine the complexity of the maneuver.

If number of arms in maneuver>MAXIMUM_NUM_ARMS_THRESHOLD
   Complexity=MANEUVER_MEDIUM_COMPLEX
   If number of arms maneuvers>1
   Complexity=MANEUVER_VERY_COMPLEX
   If maneuver type is roundabout
   Complexity=MANEUVER_VERY_COMPLEX
   If angle between 'TO' arm and any adjacent arm is <MINIMUM_ARM_ANGLE_THRESHOLD
   Complexity=MANEUVER_MEDIUM_COMPLEX
   All other types
   Complexity=MANEUVER_SIMPLE The camera position is initially at 90° and changes to the minimum camera angle as the vehicle 32 approaches the intersection. The angle can also be selectively adjusted by the user between the minimum permitted camera angle (CameraAngleMinimum) and the maximum permitted camera angle (CameraAngleMaximum). Preferably the maximum camera angle is always 90° and the minimum camera angle depends upon the complexity of the intersection. The minimum and maximum camera angles are defined as follows:

If Complexity=MANEUVER_SIMPLE
   CameraAngleMinimum=30°
   CameraAngleMaximum=90°
   If Complexity=MANEUVER_MEDIUM_COMPLEX
   CameraAngleMinimum=50°
   CameraAngleMaximum=90°
   If Complexity=MANEUVER_VERY_COMPLEX
   CameraAngleMinimum=90°
   CameraAngleMaximum=90°// no change When adjusting the camera through system or user control, a fixed scaling is applied to keep the scene in view. Example, the entire scene is adjusted in size by scaling by ~105% when decrementing the viewing angle and by ~95% when incrementing the viewing angle. Preferably, the number of increments that the scene can be viewed from ranges from 0 to 8 increments, again depending on the complexity of the maneuver. The above numbers for Minimum and Maximum Camera Angles, and Number of increments shown are for exemplary purposes. It should be recognized that the navigation system 20 may have more or less as needed.

The display 60 also includes a horizon line 69 below which is displayed the intersection 62 and maneuver instruction 64. Above the horizon line 69 is a representation of the sky 70. The sky 70 is preferably changed in color based upon the time of day, season of the year and geographic location of the vehicle 32. The CPU 22 of the navigation system 20 has information regarding the geographic location of the vehicle 32, date and current time of day. The GPS receiver 34 receives time information, including date, from the GPS system. The sky 70 is changed from blue to black based upon the time of day, including the expected sunrise and sunset times for the particular season of the year and the current geographic location of the vehicle 32. Preferably, the sky 70 gradually and continuously changes from blue during the day to black at night. This assists the user in perceiving and understanding the display 60, including the intersection 62 and the perspective view.

The display 60 further includes a text instruction field 72 which displays text of a maneuver instruction, such as "Right turn on Maple" or other turn instructions appropriate to the next maneuver. The text in the field 72 corresponds to the maneuver instruction 64.

A heading indicator 74, indicating the absolute direction of the desired destination, is also shown in 3-dimensional perspective view in display 60. The heading indicator 74 includes an arrow 75, also 3-dimensional and shown in perspective view. The angle at which the perspective of the heading indicator 74 is calculated is the same as the angle at which the intersection 62 is displayed. This further reinforces an understanding of the perspective intersection view.

The display 60 further includes a distance-to-maneuver field 76 which indicates the distance between the current position of the vehicle 32 and the next maneuver, as indicated by the maneuver instruction 64. The user can selectively adjust the angle of the display between $\alpha_A$ and $\alpha_C$ utilizing the user input device 26. A distance-to-destination field 77 indicates the total distance in the calculated route from the current location to the desired destination. A current heading indicator 78 indicates the current geographical heading of the vehicle 32.

Figure 5:
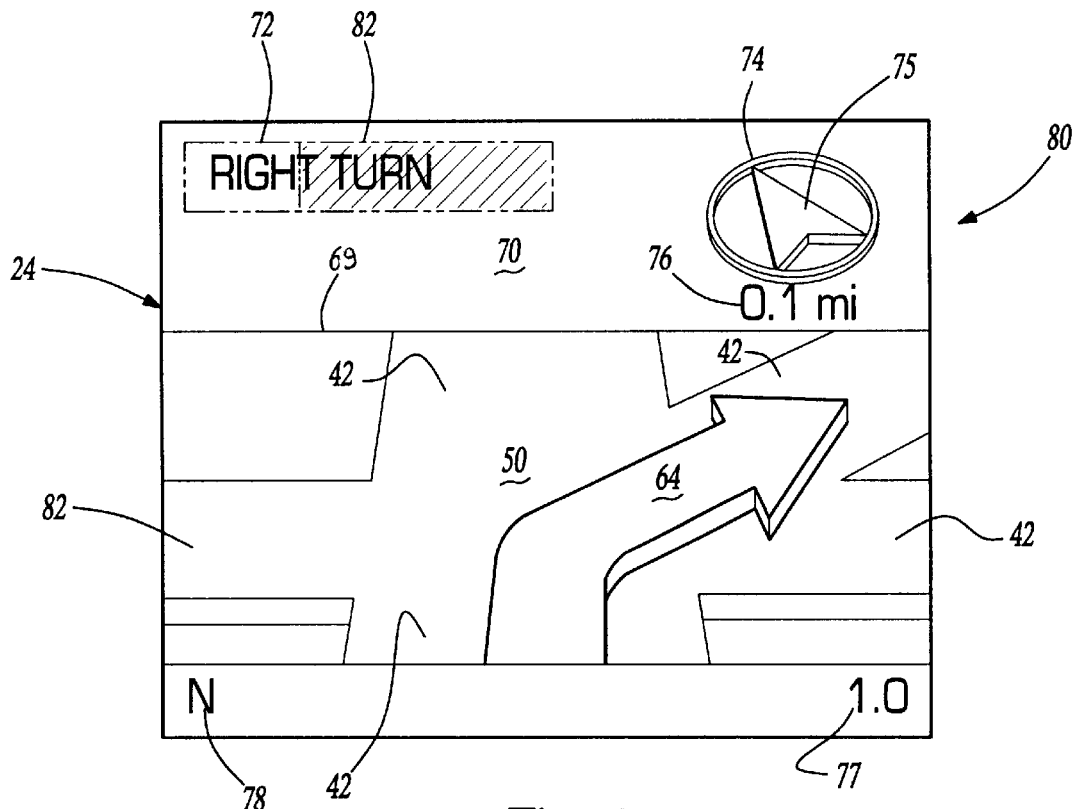
FIG. 5 is the display of FIG. 1 showing a perspective view of an area in FIG. 2C calculated according to a second viewing angle in FIG. 3.

Referring to FIG. 5, display 80 is shown on the display 24 when the vehicle approaches a medium complex intersection, such as that represented in two dimensional data in FIG. 2C. The two dimensional data for the intersection of FIG. 2C is transformed into a 3-dimensional model and rotated into a perspective view according to the angle $\alpha_B$ of the FIG. 3, preferably 50 degrees. Preferably, the view of the intersection 50 of FIG. 2C is first calculated at angle $\alpha_C$ of FIG. 3 and gradually decreased as the vehicle 32 approaches the intersection to angle $\alpha_B$. This increases the user's understanding of the intersection and the perspective view. By the time the vehicle 32 approaches the next maneuver, the perspective angle is decreased $\alpha_B$, as displayed in FIG. 5. Again the arms 42 are shown having thickness and in perspective, although the perspective angle is higher and the view is more overhead. The maneuver instruction 64 is also shown in three dimensions and in the same perspective view, calculated according to angle $\alpha_B$. The heading indicator 74 is also shown in three dimensions and shown in a perspective view calculated according to angle $\alpha_B$. Again, this assists the user in understanding the perspective at which the intersection 82 is displayed. The user can selectively adjust the angle of the display between $\alpha_B$ and $\alpha_C$ utilizing the user input device 26.

As is also shown in FIG. 5, when the distance to the maneuver 76 reaches 0.1 miles, the text instruction field 72 becomes a bar graph 82 indicating more precisely the distance to the upcoming maneuver. The bar graph 82 gradually and continuously decreases as the vehicle 32 approaches the maneuver. Portions of the bar graph 82 which overlap text in the text instruction field 72 become reverse video, as shown.

Figure 6:
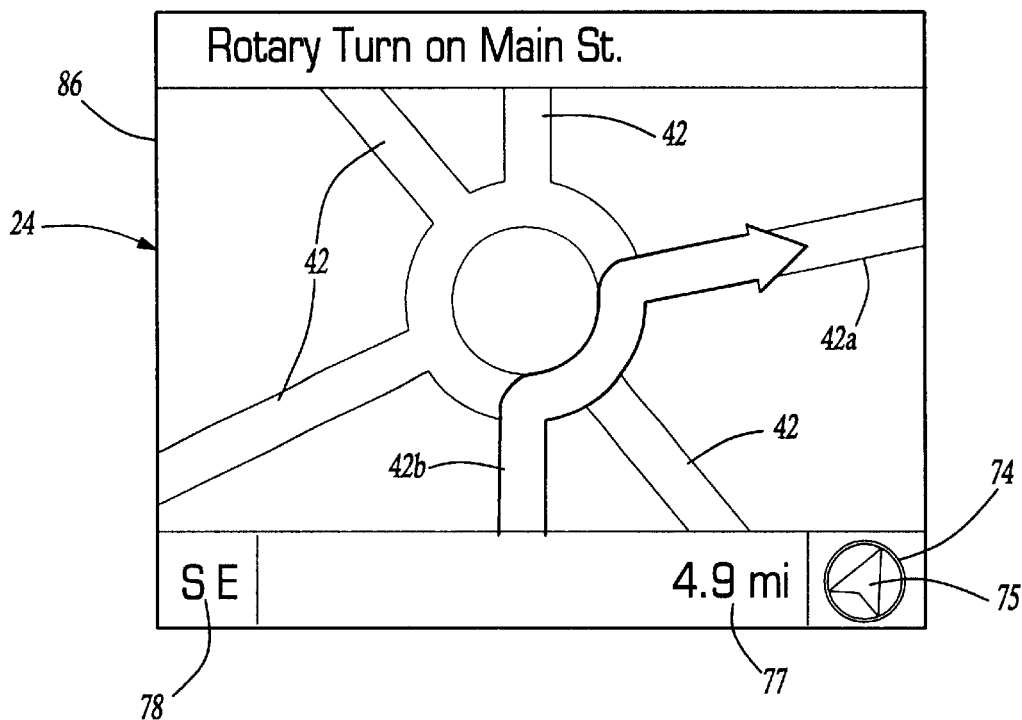
FIG. 6 is the display of FIG. 1 showing a plan view of an area in FIG. 2E calculated according to a third viewing angle in FIG. 3.

Referring to FIG. 6, display 86 is shown on the display 24 when the vehicle approaches a very complex intersection, such as that represented in two dimensional data in FIG. 2E. The two dimensional data for the intersection of FIG. 2E is transformed into a 3-dimensional model according to the angle $\alpha_C$ of the FIG. 3, preferably 90 degrees. By increasing the viewing angle $\alpha$ of the perspective view of a complex intersection 48, the road segments or arms 42 are more readily distinguishable and the maneuver instruction 64 is easier to understand.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle navigation system comprising:
   a database of roads to be traveled by a vehicle;

a processor determining a viewing angle based upon a complexity of an intersection in said database;

a display displaying said intersection at a perspective view calculated at the viewing angle.

2. The vehicle navigation system of claim 1 wherein said display displays said intersection, a horizon and a sky.

3. The vehicle navigation system of claim 2 wherein said display changes a color of said sky based upon a time of day.

4. The vehicle navigation system of claim 3 wherein said time of day is received from a GPS receiver.

5. The vehicle navigation system of claim 1 wherein said processor determines said complexity of said intersection based upon a number of roads on said intersection.

6. The vehicle navigation system of claim 1 wherein said processor determines said complexity of said intersection based upon a distance between roads in said intersection.

7. The vehicle navigation system of claim 1 wherein said processor determines said complexity of said intersection based upon an angular separation between adjacent roads in said intersection.

8. The vehicle navigation system of claim 7 wherein said angular separation is between a TO road, which is recommended, and a nearest adjacent road in said intersection.

9. The vehicle navigation system of claim 1 wherein said processor determines said complexity of said intersection based upon a type of said intersection.

10. The vehicle navigation system of claim 1 wherein said processor increased the viewing angle of said intersection with the complexity of the intersection.

11. The vehicle navigation system of claim 1 wherein said display displays a three dimensional heading indicator icon at said viewing angle.

12. The vehicle navigation system of claim 1 wherein said viewing angle changes as the vehicle approaches the intersection.

13. The vehicle navigation system of claim 1 wherein said viewing angle is user-adjustable between a maximum viewing angle and a minimum viewing angle, said minimum viewing angle determined based upon said complexity of said intersection.

14. A method for navigating a vehicle including the steps of:

a) determining a route from a database of roads to a desired destination, said route including an intersection;

b) determining a complexity of said intersection;

c) determining a viewing angle based upon said complexity of said intersection; and d) displaying said intersection as a perspective view at said viewing angle.

15. The method of claim 14 further including the step of constructing a three-dimensional model of said intersection from two-dimensional data in said database.

16. The method of claim 14 further including the steps of:

e) determining a time of day;

f) displaying a sky adjacent said intersection in said step d); and g) adjusting color of said sky based upon said time of day.

17. The method of claim 16 wherein said color of said sky is adjusted between blue and black.

18. The method of claim 14 wherein said step b) is based upon a number of roads in said intersection.

19. The method of claim 14 wherein said step b) is based upon a spacing of roads in said intersection.

20. The method of claim 14 wherein said step b) is based upon an angular separation between adjacent roads in said intersection.

* * * * *